United States Patent
Uphaus

[19]

[11] Patent Number: 5,984,356
[45] Date of Patent: Nov. 16, 1999

[54] UNIBODY UNDERCARRIAGE AND MOUNTS

[76] Inventor: Roderick Uphaus, 103 Dendron Ave., Troy, Ala. 36081

[21] Appl. No.: 09/028,568

[22] Filed: Feb. 24, 1998

Related U.S. Application Data

[63] Continuation-in-part of application No. 08/964,789, Nov. 5, 1997.

[51] Int. Cl.[6] .................................................... B62D 21/00
[52] U.S. Cl. ........................................... 280/781; 180/312
[58] Field of Search .................................... 180/312, 350; 280/781

[56] References Cited

U.S. PATENT DOCUMENTS

| | | | |
|---|---|---|---|
| 4,606,429 | 8/1986 | Kurata | 180/312 |
| 4,896,899 | 1/1990 | Lawrence | 180/350 |
| 5,238,267 | 8/1993 | Hutchinson et al. | 280/781 |

*Primary Examiner*—Kenneth R. Rice
*Attorney, Agent, or Firm*—Robert J. Veal; Kenneth M. Bush; Veal & Bush, LLC

[57] ABSTRACT

A go-kart construction uses a unibody construction wherein the body serves as a part of the suspension as well. The molded body is made from a flexible yet resilient material such as fiberglass or a suitable plastic such that it has sufficient flexion about a longitudinal axis to allow some twisting deformity without sagging when a passenger is supported in the vehicle. The forward suspension is mounted only to the forward portion of the molded body and includes a transverse member on which vertical bearings for the steerable guidance wheels are mounted, however, the transverse member is connected to the flexible body only by a pair of longitudinally extending members which are freely rotatably connected to the transverse member at their forward ends.

15 Claims, 4 Drawing Sheets

UNIBODY UNDERCARRIAGE AND MOUNTS

RELATED APPLICATION

This a continuation in part of Ser. No. 08/964,789, filed on Nov. 5, 1997 currently pending, commonly owned herewith.

FIELD OF THE INVENTION

The present invention relates to the field of miniature vehicles and more particularly to the field of vehicles designed for use by children. In even greater particularity, the present invention relates to vehicles for children designed for low speeds over outdoor terrain. In still greater particularity, the present invention may be described as an internal combustion powered vehicle having a ground following suspension comprised of a flexible body and a semi-independent forward suspension. In further particularity, the present invention relates to such a vehicle wherein the engine is cantilever mounted relative to the rear axle to provide a non-stalling inertial boost to the vehicle.

BACKGROUND

Children's vehicles or carts as they are sometimes called are well known in the art. Internal combustion karts are often called "go-karts," presumably in recognition of the ability of the vehicles to traverse the ground at an apparent high rate of speed relative to the proximity to the ground. Accordingly, "go-carts" may not be suitable for very young drivers such as preschoolers. One form of vehicle for very young drivers is the battery operated toy car, however, the battery frequently requires recharging and is cumbersome to recharge and to transport. Therefore, the toy is often left sitting in an unused state for long periods of time, or is quickly disposed of by parents who become frustrated by the charging cycle of the battery or the low tolerance of such vehicles for outdoor terrain.

Carts are often provided with a substantially rigid frame such that the wheels on either side are fixed in relation to each other. The carts are not built with leaf spring suspension like passenger cars or with compression springs, therefore, when uneven or unlevel terrain is encountered, often times one of the steerable guidance wheel will be lifted off the ground thereby reducing the control of the vehicle frightening the young driver and perhaps resulting in a total loss of control.

Additionally, there exists a problem with low power vehicles of this genre when the vehicle is started on uneven terrain or uphill in that the inertia of the vehicle is difficult to overcome without some expertise without an abrupt start.

There exists a need for a cart that offers the convenience of an internal combustion engine with the safety of a ground engaging suspension, a low speed of operation, and an assisted movement configuration.

SUMMARY OF THE INVENTION

It is the principal object of the present invention to provide a safe vehicle for children to use in an outdoor environment.

It is a further object of the present invention to provide a cart type vehicle for children that has the positive steering capabilities enhanced by continuous contact of the guidance wheels with the ground.

It is an associated object of the present invention to provide a cart type vehicle for children which has a flexible suspension system that allows the child to maintain control of the vehicle.

It is a further object of the invention to provide a motor arrangement which facilitates the initial movement of the vehicle by indirect transfer of energy other than through the drive train.

These and further objects and advantages of the present invention are advantageously accomplished by the use of a UNIBODY construction wherein the body serves as a part of the suspension as well. The molded body is made from a flexible yet resilient material such as fiberglass or a suitable plastic such that it has sufficient flexion about a longitudinal axis to allow some twisting deformity without sagging when a passenger is supported in the vehicle. The forward suspension is mounted to the forward portion of the molded body and includes a transverse member on which vertical bearings for the steerable guidance wheels are mounted, however, the transverse member is connected to the flexible body only by a pair of longitudinally extending members which are freely rotatably connected to the transverse member at their forward ends. Thus as one side or the other of the body is elevated relative to the other such that the body flexes about its longitudinal axis, the transverse member is free to align itself with the inclination of the subjacent surface and thereby keep both steerable wheels in contact with the ground. The rear of the longitudinal members is likewise rotatably connected to rear transverse frame members for optimum flexibility.

To overcome inertial resistance to initial movement of the vehicle the motor is cantilever mounted relative to the drive axle such that it is subjected to some oscillatory motion due to the dynamic loading of the mount while the motor is engaged and the vehicle is essentially motionless. This movement of the mass of the motor is sufficient to impart a rocking force onto the vehicle along an axis aligned with the intended direction of motion to assist in overcoming inertia.

BRIEF DESCRIPTION OF THE DRAWINGS

Apparatus embodying features of the invention are depicted in the accompanying drawings which form a portion of this disclosure and wherein.

DESCRIPTION OF THE PREFERRED EMBODIMENT

Figure 1:
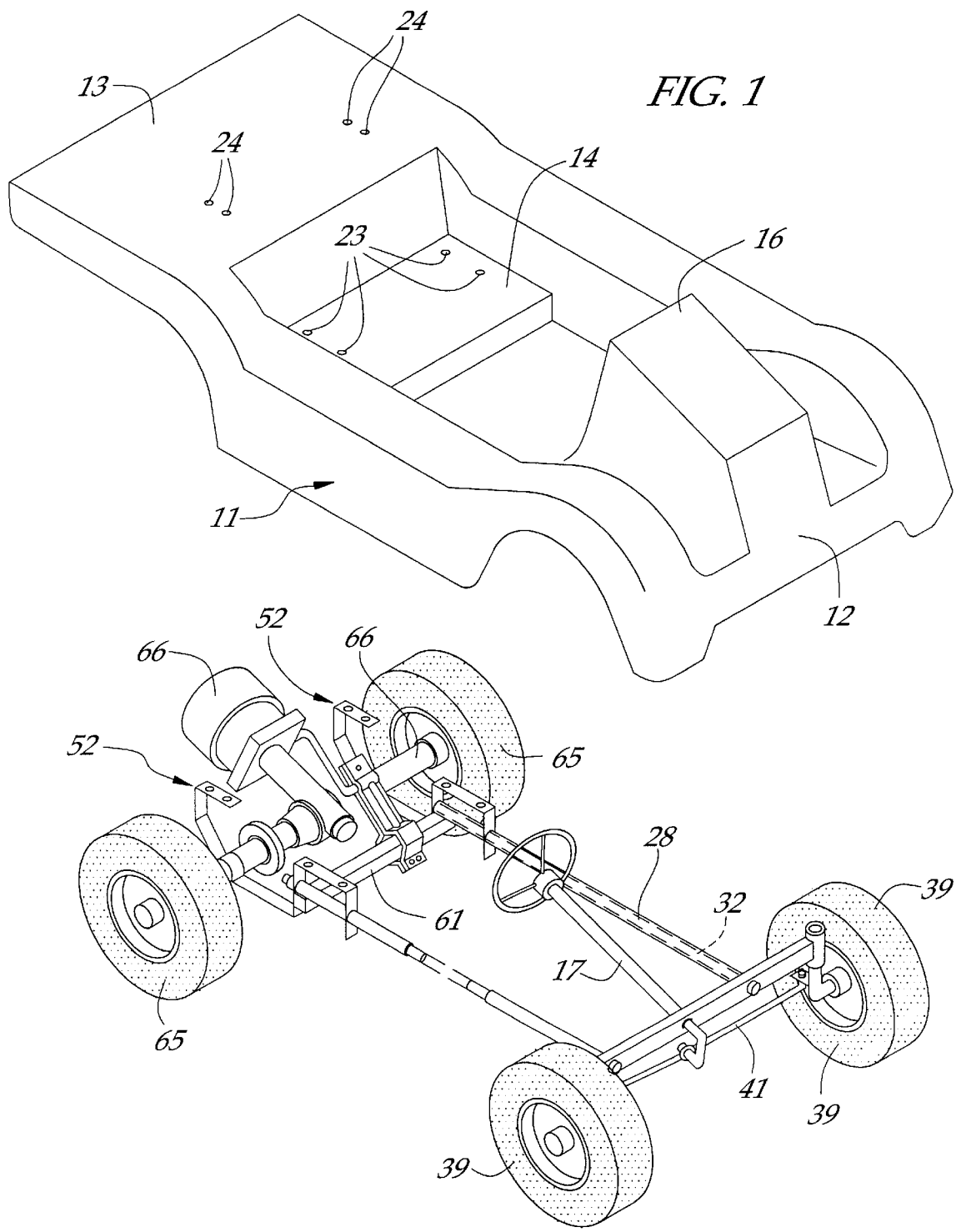
FIG. 1 is an exploded perspective view showing the body and suspension members separated from one another.

Referring to the Figures for a clearer understanding of the invention it will be appreciated in FIG. 1 that the present invention is concerned with a combination of elements in a particular manner. Specifically, the cart which embodies this invention utilizes a unibody construction in that the body 11 is generally molded as a monolithic structure. Preferentially the body 11 is molded from fiberglass or some durable plastic such as ABS, although some ceramic composite materials may be acceptable. The necessary quality of the body material is that it be sufficiently rigid to support a passenger without the need for substantial transverse frame suspension and flexible enough about a longitudinal axis to achieve the result described hereinafter.

The body 11 is formed with a forward portion 12 and a rearward portion 13, with a passenger seat 14 formed intermediate the forward and rearward portions. A console like projection 16 may be formed longitudinally forwardly of the passenger seat at 14 and a steering column 17 with an attached steering wheel may extend from the console. The underside 18 of body 11 is formed with a pair of longitudinal grooves 19 extending beneath forward portion 12. Apertures 23 are formed in passenger seat 14 and apertures 24 are formed in the rear portion 13.

A front suspension assembly 26 is affixed to a pair of elongated tubes 27 and 28 which are cooperatively received in grooves 19. The tubes 27 and 28 each have an elongated threaded rod 31 and 32 extending therethrough. A transverse frame member 33 has pairs of spaced apart orifices 34 and 34' therethrough in axial alignment with tubes 27 and 28 such that threaded rods 31 and 32 may pass therethrough for threaded engagement with fasteners 36. Orifices 34 are unthreaded and receive rods 31 and 32 rotatably therein. Orifices 34' are likewise unthreaded and are of sufficient diameter to receive the forward ends of tubes 27 and 28. A threaded nut 35 is positioned on each threaded rod 31 and 32 at a point just inside the end of each elongated tube 27 and 28 to center and align the rods 31 and 32 and tubes 27 and 28 relative to frame member 33. Thus, each tube 27 and 28 and frame member 33 are rotatable relative to each other about the longitudinal axis of the tube 27 or 28.

Frame member 33 has an aperture in which the steering column 17 is captured for rotation. At either end of frame member 33, a pair of vertical sleeves 37 are affixed to receive therethrough an L-shaped axle 38 for each steerable wheel 39. The L-shaped axles are appropriately mounted in the sleeves in bearings which allow rotation about a generally vertical axis such that the associated wheel 39 mounted on the horizontal portion of the axle is turned to the right or left. The axles 38 are cooperatively attached to the steering column 17 by tie rods 41.

From the forgoing, it may be seen that the only attachment of the steerable wheels to the body is via the tubes 27 and 28, such that as the vehicle traverses an uneven surface and the body 11 flexes about its longitudinal axis both tubes 27 and 28 rotate within orifices 34. The tubes 27 and 28 are connected to the body closer to the rear of the tube and thus provide a cantilevered connection. Tubes 27 and 28 are attached to the rear suspension as hereinafter described.

The rear suspension 51 connects rear portion 13 of body 11 to a pair of drive wheels 65. The suspension includes a pair of longitudinally extending flexion members 52 each including a first segment 52a extending generally horizontally and affixed to a rearward area of rear portion 13, a second segment 52b extending downwardly from a rearmost portion of first segment 52a, a third segment 52c extending downwardly and forwardly from second segment 52b, a fourth segment 52d extending generally horizontally and forwardly from third segment 52c, a fifth segment 52e extending upwardly from fourth segment 52d, a sixth segment 52f extending forwardly and generally horizontally beneath rear portion of body 11 intermediate said rearmost portion and said passenger seat, and a seventh segment 52g extending downwardly from sixth segment 52f, said first segment and said sixth segment being affixed to said rear portion 13. Longitudinally extending flexion members 52 are connected by a transverse member 61 extending between respective fifth segments 52e thereof and drive wheels 65 are connected to receive power from said internal combustion engine 66 through an enclosed axle 67 mounted to said fourth segments 52d of said flexion members.

Rods 31 and 32 may be affixed to flexion members 52 in a similar manner as they are affixed to transverse member, that is to say the rods have threads formed thereon. Each segment 52e has an orifice 68 therethrough in axial alignment with tube 27 or 28 such that a threaded rod 31 or 32 may pass therethrough for threaded engagement with a fastener 69. The orifices 68 are unthreaded and receive rods 31 and 32 rotatably therein such that each tube 27, 28 and segment 52e are rotatable relative to each other about the longitudinal axis of the tube 27 or 28.

Figure 2:
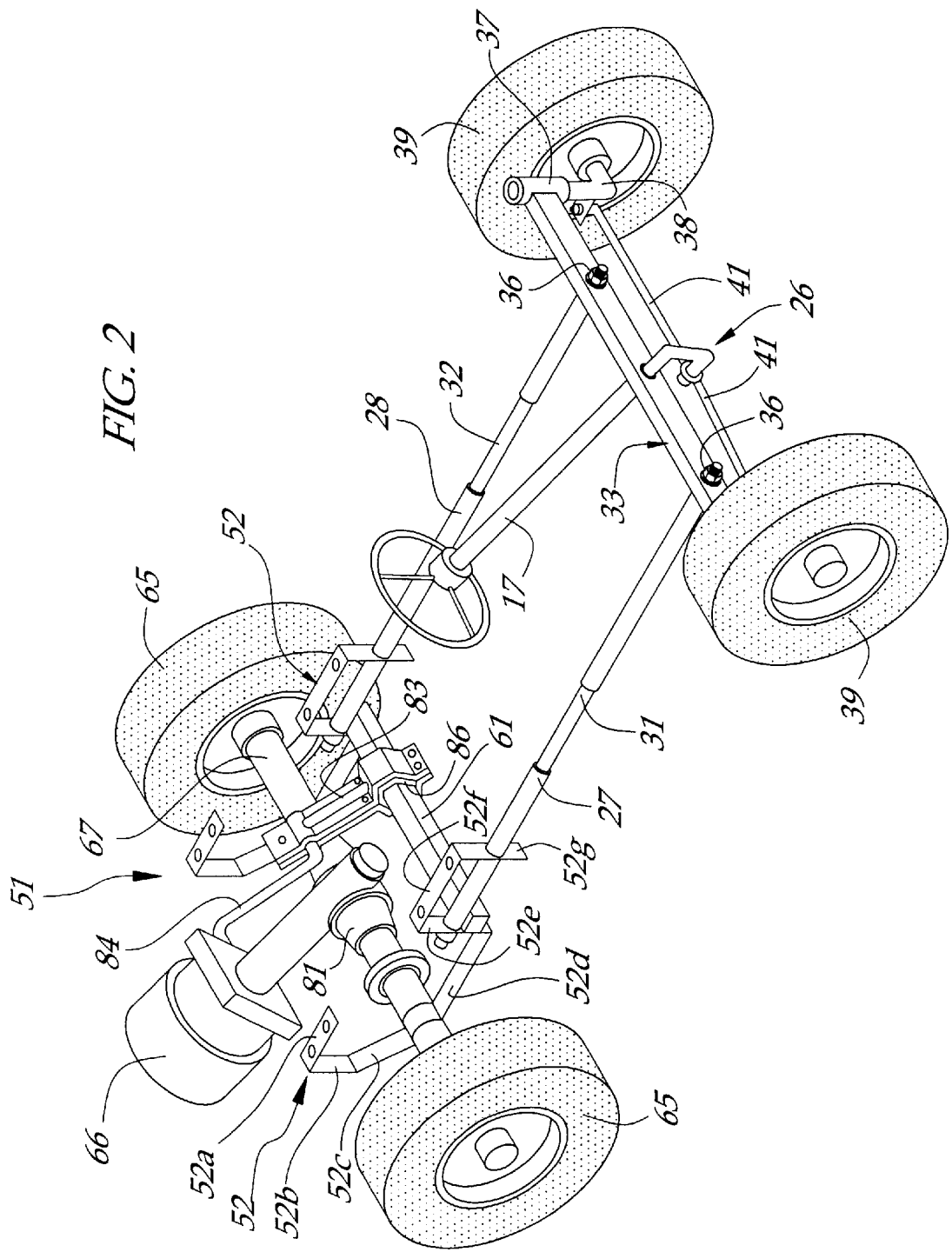
FIG. 2 is a detailed perspective view of the suspension members including the motor mount.
Figure 3:
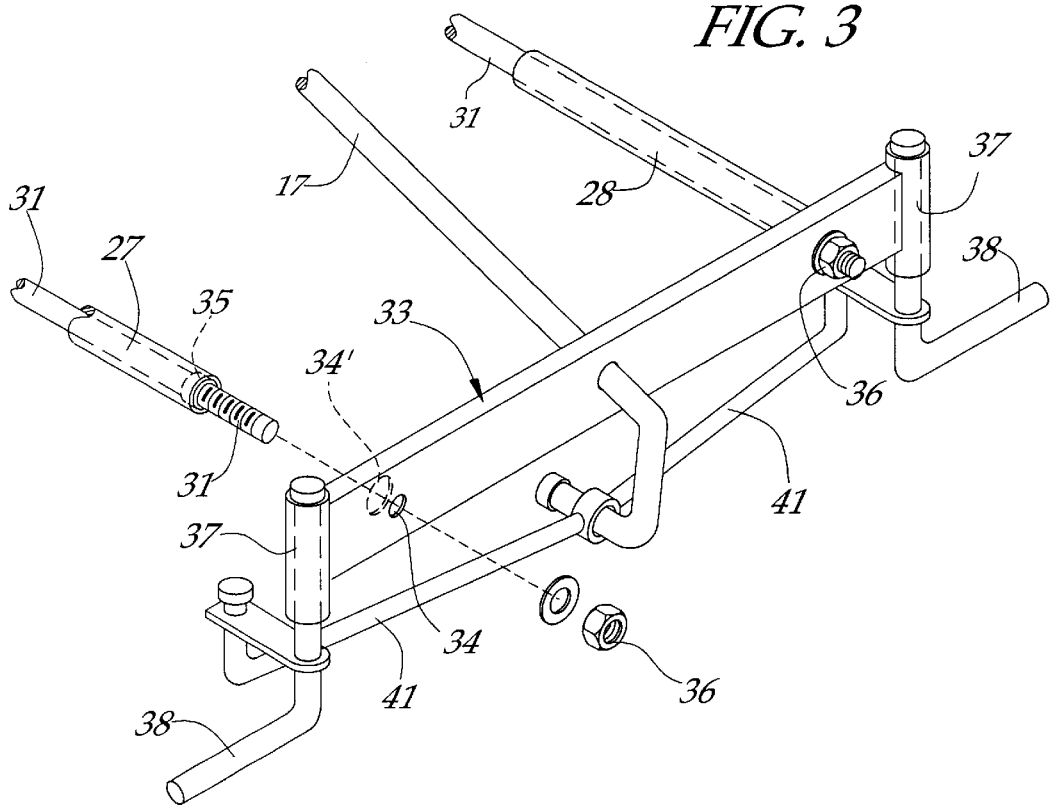
FIG. 3 is a detailed view of the front suspension in perspective.
Figure 4:
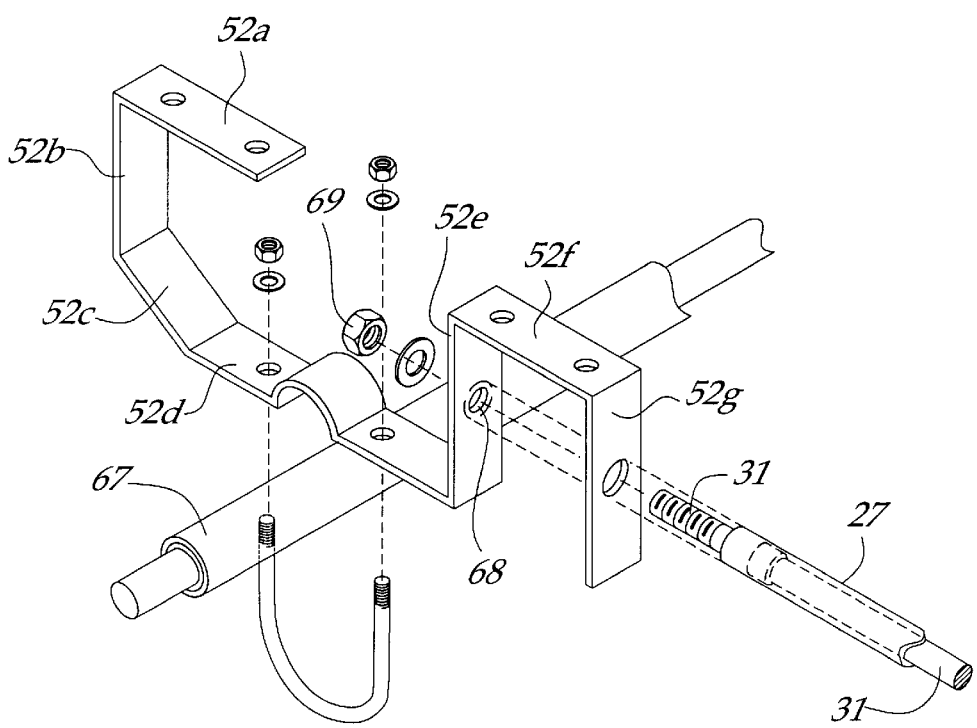
FIG. 4 is a detailed view of the rear suspension in perspective.
Figure 5:
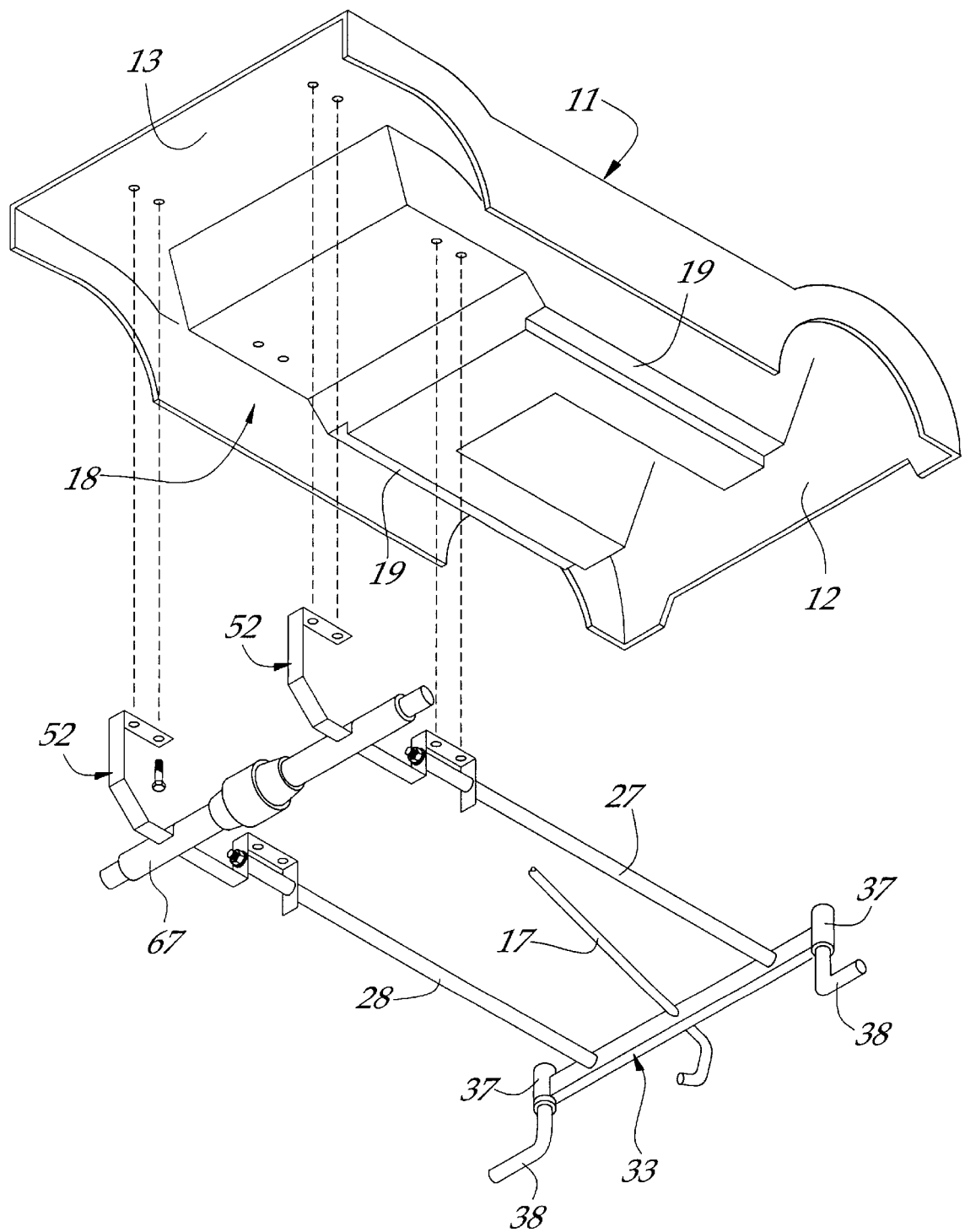
FIG. 5 is an exploded bottom perspective view.

Referring to FIGS. 1 and 2, it may be seen that enclosed axle 67 is affixed to a transmission casing 81 which extends upwardly and rearwardly from axle 67, thus housing a transmission (not shown) which is operatively connected to motor 66 through clutch 82. Likewise extending upwardly and rearwardly from transverse frame member 61 is a torque arm 83 which is connected to the motor/clutch/transmission housing by a link 84. A resilient member 86 may be interposed between torque arm and the frame member dampen the loading effect. It will be understood that the torque generated by motor 66 in this cantilevered mounting arrangement and the reactive forces on the casing and torque arm are useable to induce a rocking force on the vehicle when it is starting from a stationary position or such as when the adolescent driver is attempting to go up a grade at a rate which might stall the vehicle.

It may be seen from the foregoing that the front and rear suspensions are substantially independent from each other and the body of the vehicle allows all four wheels to remain in constant engagement with the underlying surface even on uneven terrain such as might be encountered in a yard, wherein a preschooler would be expected to operate the kart. It should be understood that the internal combustion engine would be appropriately governed to avoid operation of the kart at an excessive speed, thus the utilization of the cantilever mounted engine as an inertial booster will allow the adolescent to operate the vehicle without the necessity of an adult push starting the vehicle in most instances.

What I claim is:

1. A vehicle, suitable for use by a child, comprising, in combination:

a. a molded unitary body of a flexible resilient material defining a front portion, a rear portion, and a passenger seat;

b. a suspension assembly affixed to said molded unitary body and to a pair of concomitantly steerable front wheels, said suspension and said body adapted to allow each of said pair of front wheels to follow the contour of a surface supporting said vehicle independently of said other one of said pair of front wheels; and c. an internal combustion engine providing motive power thereto, said internal combustion engine mounted in cantilevered relationship to said suspension assembly to impart longitudinal rocking motion to said vehicle to overcome standing inertia.

2. A vehicle as defined in claim 1 wherein said suspension assembly comprises:

a. first and second longitudinal members extending subjacent said front portion and affixed thereto in spaced relation from one another;

b. a transverse member extending between said first and second longitudinal members and rotatably receiving a forward end of each of said members therethrough; and, c. means for mounting said steerable front wheels to opposing ends of said transverse member for concomitant steering about an axis substantially orthogonal to said transverse member and said longitudinal members.

3. A vehicle as defined in claim 2 wherein said body defines longitudinal channels therein for receiving said longitudinal members forwardly of said passenger seat and further comprising a rear suspension assembly connected to said body and to said longitudinal members to support a rear portion thereof.

4. A vehicle as defined in claim 1 further comprising a rear suspension assembly for supporting said rear portion on a pair of drive wheels comprising in combination: a pair of longitudinally extending flexion members each including a first segment extending generally horizontally and affixed to rearward area of said rear portion, a second segment extending downwardly from a rearmost portion of said first segment, a third segment extending downwardly and forwardly from said second segment, a fourth segment extending generally horizontally and forwardly from said third segment, a fifth segment extending upwardly from said fourth segment, and a sixth segment extending forwardly and generally horizontally beneath said rear portion intermediate said rearmost portion and said passenger seat, said first segment and said sixth segment being affixed to said rear portion.

5. A vehicle as defined in claim 4 wherein said pair of longitudinally extending flexion members are connected by a transverse member extending between respective fifth segments thereof and said drive wheels are connected to receive power from said internal combustion engine through an enclosed axle mounted to said fourth segments of said flexion members.

6. A vehicle as defined in claim 1 further comprising a rear suspension assembly for supporting said rear portion on a pair of drive wheels connected by a drive axle comprising a pair of longitudinally extending flexion members affixed to said body and connected to each other by a transverse member which is parallel and spaced from said drive axle, said motor connected to said transverse member by a torque arm extending upwardly and rearwardly therefrom and connected to said drive axle by a transmission.

7. In a vehicle for children, wherein said vehicle has means for controlling the direction of said vehicle through a pair of forwardly mounted wheels, the improvement comprising: a flexible unitary body having a forward and rear portion and serving to support a passenger on a seat formed thereon; forward suspension means cooperatively connected to said unitary body at said forward portion such that said body and suspension means allow each of said pair of forwardly mounted wheels to follow the contour of a surface supporting said vehicle without the use of springs; a separate rear suspension affixed to said front suspension means and supporting said rear portion of said body on a pair of drive wheels; and, an internal combustion engine cantilever mounted in relation to said rear suspension and operably connected to said drive wheels.

8. In a vehicle as defined in claim 7 wherein said body is made from a material selected from the group consisting of fiberglass, fiber reinforced resins, ABS plastic, and polyester, such that said body exhibits sufficient rigidity to support a rider and sufficient elasticity to allow said guidance wheels move vertically relative to each other in accordance with a subjacent surface.

9. In a vehicle as defined in claim 8 wherein said rear suspension for supporting said rear portion on a pair of drive wheels comprises in combination: a pair of longitudinally extending flexion members fixed to said rear portion of said body in spaced relation to each other and connected by a cross member, said flexion members cooperatively affixed to a housing for an axle connected to said drive wheels, said internal combustion engine connected to said axle by a transmission and to said cross member by an elongated torque arm.

10. A vehicle, suitable for use by a child, comprising, in combination:
   a. a molded unitary body of a flexible resilient material defining a front portion, a rear portion, and a passenger seat;
   b. a suspension assembly affixed to said molded unitary body and to a pair of concomitantly steerable front wheels, said suspension and said body adapted to allow each of said pair of front wheels to follow the contour of a surface supporting said vehicle independently of said other one of said pair of front wheels wherein said suspension assembly comprises first and second longitudinal members extending subjacent said front portion and affixed thereto in spaced relation from one another, a transverse member extending between said first and second longitudinal members and rotatably receiving a forward end of each of said members therethrough and, means for mounting said steerable front wheels to opposing ends of said transverse member for concomitant steering about an axis substantially orthogonal to said transverse member and said longitudinal members; and
   c. an internal combustion engine operatively mounted to provide motive power thereto.

11. A vehicle as defined in claim 10 wherein said body defines longitudinal channels therein for receiving said longitudinal members forwardly of said passenger seat and further comprising a rear suspension assembly connected to said body and to said longitudinal members to support a rear portion thereof.

12. A vehicle as defined in claim 10 further comprising a rear suspension assembly for supporting said rear portion on a pair of drive wheels comprising in combination: a pair of longitudinally extending flexion members each including a first segment extending generally horizontally and affixed to rearward area of said rear portion, a second segment extending downwardly from a rearmost portion of said first segment, a third segment extending downwardly and forwardly from said second segment, a fourth segment extending generally horizontally and forwardly from said third segment, a fifth segment extending upwardly from said fourth segment, and a sixth segment extending forwardly and generally horizontally beneath said rear portion intermediate said rearmost portion and said passenger seat, said first segment and said sixth segment being affixed to said rear portion.

13. A vehicle as defined in claim 12 wherein said pair of longitudinally extending flexion members are connected by a transverse member extending between respective fifth segments thereof and said drive wheels are connected to receive power from said internal combustion engine through an enclosed axle mounted to said fourth segments of said flexion members.

14. A vehicle as defined in claim 10 further comprising a rear suspension assembly for supporting said rear portion on a pair of drive wheels connected by a drive axle comprising a pair of longitudinally extending flexion members affixed to said body and connected to each other by a transverse member which is parallel and spaced from said drive axle, said motor connected to said transverse member by a torque arm extending upwardly and rearwardly therefrom and connected to said drive axle by a transmission to impart longitudinal rocking motion to said vehicle to overcome standing inertia.

15. A vehicle as defined in claim 11 wherein said longitudinal members comprises rods threaded at each end and said flexion members and said transverse member define unthreaded orifices through which said longitudinal members extend, and further comprising fastening means engaged on said threaded ends to retain said longitudinal members in said orifices and means engagable with said body portion to retain said longitudinal members in said channels.

* * * * *